United States Patent
Deaville

(10) Patent No.: US 10,449,731 B2
(45) Date of Patent: Oct. 22, 2019

(54) APPARATUS AND PROCESS FOR FORMING THREE-DIMENSIONAL OBJECTS

(71) Applicant: MAGNA INTERNATIONAL INC., Aurora (CA)

(72) Inventor: Todd Deaville, Markham (CA)

(73) Assignee: Magna International Inc., Aurora (CA)

( * ) Notice: Subject to any disclaimer, the term of this patent is extended or adjusted under 35 U.S.C. 154(b) by 272 days.

(21) Appl. No.: 15/302,196

(22) PCT Filed: Apr. 27, 2015

(86) PCT No.: PCT/CA2015/000289
§ 371 (c)(1),
(2) Date: Oct. 6, 2016

(87) PCT Pub. No.: WO2015/164954
PCT Pub. Date: Nov. 5, 2015

(65) Prior Publication Data
US 2017/0021565 A1    Jan. 26, 2017

Related U.S. Application Data

(60) Provisional application No. 61/986,559, filed on Apr. 30, 2014.

(51) Int. Cl.
*B29C 67/00* (2017.01)
*B33Y 30/00* (2015.01)
(Continued)

(52) U.S. Cl.
CPC ........ *B29C 67/0081* (2013.01); *B29C 64/106* (2017.08); *B29C 64/165* (2017.08);
(Continued)

(58) Field of Classification Search
CPC ... B29C 70/382; B29C 70/384; B29C 70/386; B29C 70/388; B29C 69/005;
(Continued)

(56) References Cited

U.S. PATENT DOCUMENTS 5,936,861 A * 8/1999 Jang ...................... B29C 70/384
                                                    700/98
6,080,343 A   6/2000 Kaufman et al.
(Continued)

FOREIGN PATENT DOCUMENTS

| CA | 2850628 A1 | 5/2013 |
| GB | 2487050 A | 7/2012 |
| WO | WO2007138619 A1 | 12/2007 |

OTHER PUBLICATIONS

Advanced Fibre Placement, retrieved from the Internet Feb. 16, 2014, url: https://www.scribd.com/document/197714785/Advanced-Fibre-Placement-Farnborough-Air-Show-2012, pp. 1-21.
(Continued)

*Primary Examiner* — Joseph S Del Sole
*Assistant Examiner* — Lawrence D. Hohenbrink, Jr.
(74) *Attorney, Agent, or Firm* — Aventum IP Law LLP

(57) ABSTRACT

An apparatus for forming a three-dimensional (3D) object includes a 3D printing head, for fabricating a first portion of the 3D object by forming a plurality of successive layers of a first material. The apparatus also includes a delivery head for fabricating a second portion of the 3D object by dispensing onto the first portion of the 3D object a plurality of layers of a continuous-fiber reinforced second material. Further, the delivery head includes comprising a roller for pressing the continuous-fiber reinforced second material into place during the dispensing thereof. A controller con-
(Continued)

trols the 3D printing head and the delivery head to cooperatively form the 3D object, based on a dataset corresponding to a 3D object model.

25 Claims, 14 Drawing Sheets

(51) Int. Cl.
  *B29C 70/38* (2006.01)
  *B29C 64/106* (2017.01)
  *B29C 64/165* (2017.01)
  *B29C 64/188* (2017.01)
  *B29C 64/194* (2017.01)
  *B29C 69/00* (2006.01)
  *B29C 64/118* (2017.01)
  *B33Y 10/00* (2015.01)
  *B33Y 50/02* (2015.01)

(52) U.S. Cl.
  CPC .......... *B29C 70/382* (2013.01); *B29C 70/386* (2013.01); *B33Y 30/00* (2014.12); *B29C 64/118* (2017.08); *B29C 64/188* (2017.08); *B29C 64/194* (2017.08); *B29C 69/005* (2013.01); *B29C 70/384* (2013.01); *B29C 70/388* (2013.01); *B33Y 10/00* (2014.12); *B33Y 50/02* (2014.12)

(58) Field of Classification Search
  CPC ... B29C 64/106; B29C 64/118; B29C 64/165; B29C 64/188; B29C 64/194
  USPC ................................. 264/129, 308; 425/375
  See application file for complete search history.

(56) References Cited

U.S. PATENT DOCUMENTS

| 6,214,279 | B1 | 4/2001 | Yang et al. |
| 10,059,057 | B2 * | 8/2018 | Schirtzinger ........... B29C 70/30 |
| 2008/0006966 | A1 * | 1/2008 | Mannella .............. B29C 64/106 264/259 |
| 2013/0071599 | A1 | 3/2013 | Kraibuhler et al. |
| 2013/0287933 | A1 | 10/2013 | Kaiser et al. |
| 2014/0291886 | A1 * | 10/2014 | Mark ................... B29C 64/118 264/163 |

OTHER PUBLICATIONS

David Groppe, Robots speed lay-up of composite materials, Elsevier Science Ltd., REINFORCEDplastics Apr. 2003, pp. 44-47.
Overview of Thermoplastic Composite ATL and AFP Technologies, (Manuscript D2, ITHEC 2012, International Conference & Exhibition on Thermoplastic Composites, Bremen, Germany, Oct. 29-30, 2012), pp. 1-4.
International Search Report, PCT/2015/000289, dated Jul. 16, 2015.

* cited by examiner

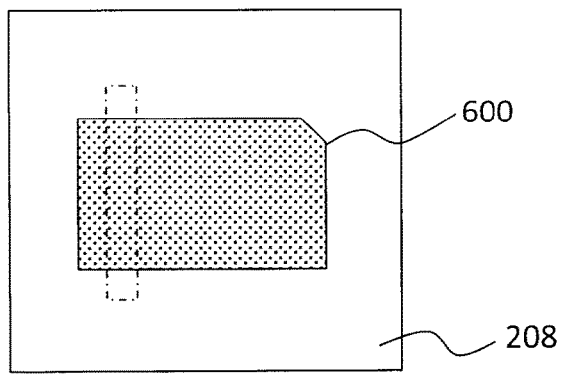
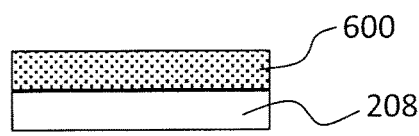
Figure 6A                Figure 7A
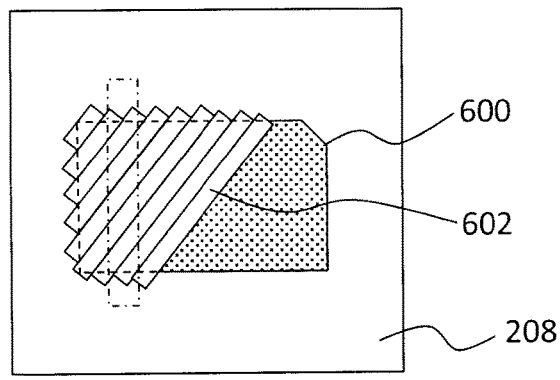
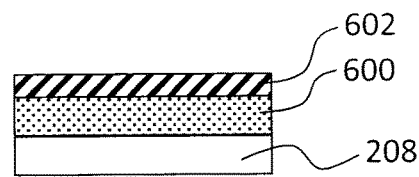
Figure 6B                Figure 7B
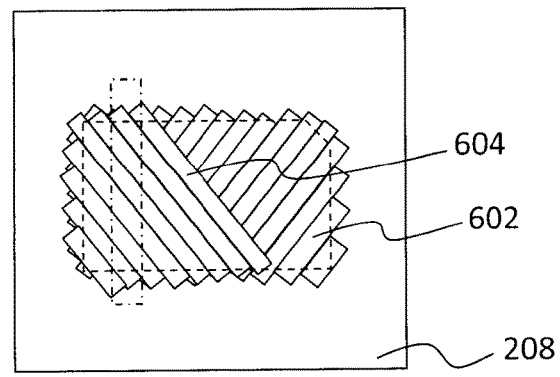
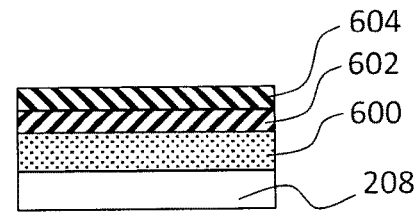
Figure 6C                Figure 7C

APPARATUS AND PROCESS FOR FORMING THREE-DIMENSIONAL OBJECTS

FIELD OF THE INVENTION

The instant invention relates generally to an apparatus and process for forming three-dimensional (3D) objects, or for forming 3D features on a substrate. More particularly, the instant invention relates to a rapid-prototyping apparatus and a process for forming 3D objects or 3D features having fiber-reinforced sections.

BACKGROUND OF THE INVENTION

The term "3D printing" refers to a group of additive manufacturing processes, in which 3D objects are created layer upon layer using unreinforced resins, resins containing short fibers, metal, paper, etc. Several different types of 3D printing systems have been developed, including systems that are based on material extrusion, material jetting, direct energy deposition, etc. Current applications of 3D printing systems include rapid prototyping (RP), as well as distributed manufacturing of replacement parts and other low volume products. The ability to produce individual parts based on dataset representations of the desired objects, and without the use of specialized tools or molds, offsets the slow production speed and high production costs that are associated with 3D printing.

Unfortunately, printed 3D objects that are made from thermoplastic or thermoset polymer resins do not possess sufficient mechanical strength or durability to be used in semi-structural or structural applications. Of course, using a resin that contains short reinforcement fibers does improve the mechanical properties of plastic 3D printed objects, but the extent of this improvement is limited by the nature of the 3D printing process itself. On the other hand, printed 3D objects that are made from metal have a much higher mechanical strength and durability. That being said, the cost of metal 3D printing systems is still very high compared to the plastic 3D printing systems. Further, the use of molten metal in the manufacturing process creates a need for more elaborate safety and fire suppression equipment.

A different type of additive manufacturing process is based on automated tape laying (ATL) or automated fiber placement (AFP). For instance, manufacturing processes based on ATL or AFP machines are currently being used in the production of advanced composite parts, such as for instance aircraft components. In such processes, an ATL or AFP machine places fiber reinforcements on a mold or mandrel in an automatic fashion. More particularly, these machines use thermoset or thermoplastic pre-impregnated materials in the form of tapes or tows to form composite layups. For instance, ATL machines use one or more tapes each having a width between about 75 and 300 mm, whereas AFP machines use a number of small width tows that are typically less than about 8 mm wide. As such, ATL achieves a much higher deposition rate compared to AFP, but also produces much more waste. The ATL and AFP processes are capable of forming components with very high mechanical strength, and that are suitable for semi-structural and structural applications. Unfortunately, a specialized mold or mandrel is required for each component that is produced, which increases the production cost in rapid prototyping or low volume applications.

It would be beneficial to overcome at least some of the above-mentioned limitations and disadvantages.

SUMMARY OF THE INVENTION

According to an aspect of at least one embodiment of the instant invention, an apparatus for forming a three-dimensional (3D) object is disclosed, comprising: a 3D printing head for fabricating a first portion of the 3D object by forming a plurality of successive layers of a first material; a delivery head for fabricating a second portion of the 3D object by dispensing onto the first portion of the 3D object a plurality of layers of a continuous-fiber reinforced second material, and comprising a roller for pressing the continuous-fiber reinforced second material into place during the dispensing thereof; and a controller for receiving a dataset corresponding to a 3D object model and for directing the 3D printing head and the delivery head to cooperatively form the 3D object based on the dataset.

According to an aspect of at least one embodiment of the instant invention, a process for forming a three-dimensional object is disclosed, comprising: receiving a dataset corresponding to a 3D object model; fabricating a first portion of the 3D object based on the dataset by forming a plurality of successive layers of a first material using a 3D printing head; and fabricating a second portion of the 3D object based on the dataset by dispensing onto the first portion of the 3D object a plurality of layers of a continuous-fiber reinforced second material using a delivery head and pressing the continuous-fiber reinforced second material into place during the dispensing thereof.

According to an aspect of at least one embodiment of the instant invention, a process for forming a three-dimensional object is disclosed, comprising: providing a sheet-metal blank; coating at least a portion of at least one side of the formed sheet-metal blank with a primer material; receiving a dataset corresponding to a 3D object model; fabricating a first portion of a 3D feature based on the dataset, by forming on the coated at least a portion of the formed sheet-metal blank a plurality of successive layers of a first material using a 3D printing head; and fabricating a second portion of the 3D feature based on the dataset by dispensing onto the first portion of the 3D feature a plurality of layers of a continuous-fiber reinforced second material using a delivery head and pressing the continuous-fiber reinforced second material into place during the dispensing thereof.

According to an aspect of at least one embodiment of the instant invention, a process for forming a three-dimensional object is disclosed, comprising: receiving at least a dataset corresponding to a 3D object model and a removable support member therefor; fabricating the removable support member based on the at least a dataset by forming a plurality of successive layers of a first material using a 3D printing head; fabricating the 3D object based on the at least a dataset by dispensing onto the removable support member a plurality of layers of a continuous-fiber reinforced second material using a delivery head and pressing the continuous-fiber reinforced second material into place during the dispensing thereof; and removing the removable support member from the 3D object.

BRIEF DESCRIPTION OF THE DRAWINGS

The instant invention will now be described by way of example only, and with reference to the attached drawings, wherein similar reference numerals denote similar elements throughout the several views, and in which:

FIGS. 6A-6E are diagrammatic views showing various steps during the fabrication of a 3D object using a process according to an embodiment of the invention.

FIGS. 7A-7E illustrate the layered structure within the indicated portion of the 3D object at corresponding steps of the fabrication process shown in FIGS. 6A-6E.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Throughout the description, and in the appended claims, the term "3D printing head" refers to an arrangement of components that is used to form a 3D object via an additive manufacturing process. The 3D printing head may or may not include all of the components that are required to form a complete 3D printing system. For instance, in a system that uses laser light to cure a liquid photopolymer resin the 3D printing head may include only an optic component, which receives light from a laser via a fiber optic cable. The 3D printing head may be based on one of the many different types of 3D printing systems that are currently known in the art. By way of a few specific and non-limiting examples, the 3D printing head may operate on principles such as material extrusion (e.g., fused deposition modeling or FDM), material jetting (e.g., PolyJet), or direct energy deposition (e.g., laser powder forming). During use, the 3D printing head forms at least a portion of the 3D object from a material such as for instance a thermoset resin or a thermoplastic resin, or from another suitable non-metallic material. The resin may be unfilled, or it may contain relatively short fibers, minerals, etc.

Throughout this description, and in the appended claims, the term "delivery head" refers to a combination of components that is used to place thermoset or thermoplastic pre-impregnated materials in the form of tapes or tows. By way of a few specific and non-limiting examples, the delivery head may be an automated tape layup (ATL) head or an automated fiber placement (AFP) head. The delivery head includes components for advancing, heating, pressing and cutting the tapes or tows that are being dispensed.

Further, it is to be understood that a 3D object may be formed directly onto a build bed or a base plate, onto a tool surface or a mandrel, or onto a metallic or a plastic component that becomes integrated into the final 3D object (e.g., a sheet-metal blank). Portions of the 3D object that are formed using the 3D printing head may be integrated into the final 3D object, or may serve only as a build surface or scaffold that is removed at the end of the process. The 3D object may also include other materials, which may be applied using an additional head or in a separate process, such as for instance a primer material, etc.

Figure 1:
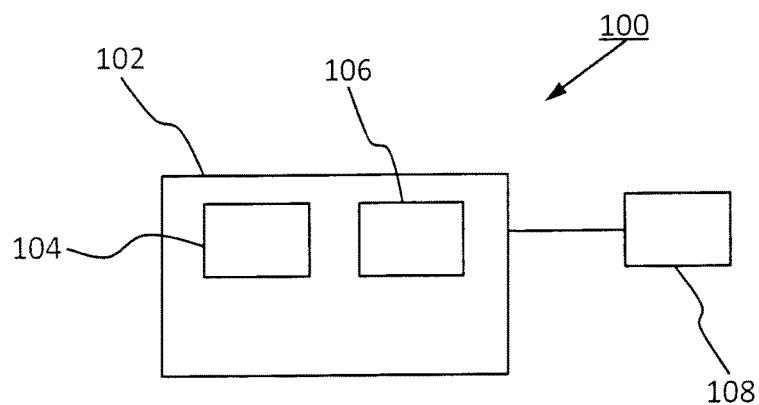
FIG. 1 is a simplified block diagram of a system according to an embodiment of the invention.

Referring to FIG. 1, shown is a simplified block diagram of a system 100 according to an embodiment of the instant invention. The system 100 includes a computer numerical control (CNC) machine 102 for precisely moving a 3D printing head 104 and a delivery head 106, during the forming of a 3D object, under the control of a controller 108. The controller 108 receives a dataset corresponding to a 3D object model, and directs the 3D printing head 104 and the delivery head 106 to cooperatively form the 3D object based on the dataset.

Figure 2:
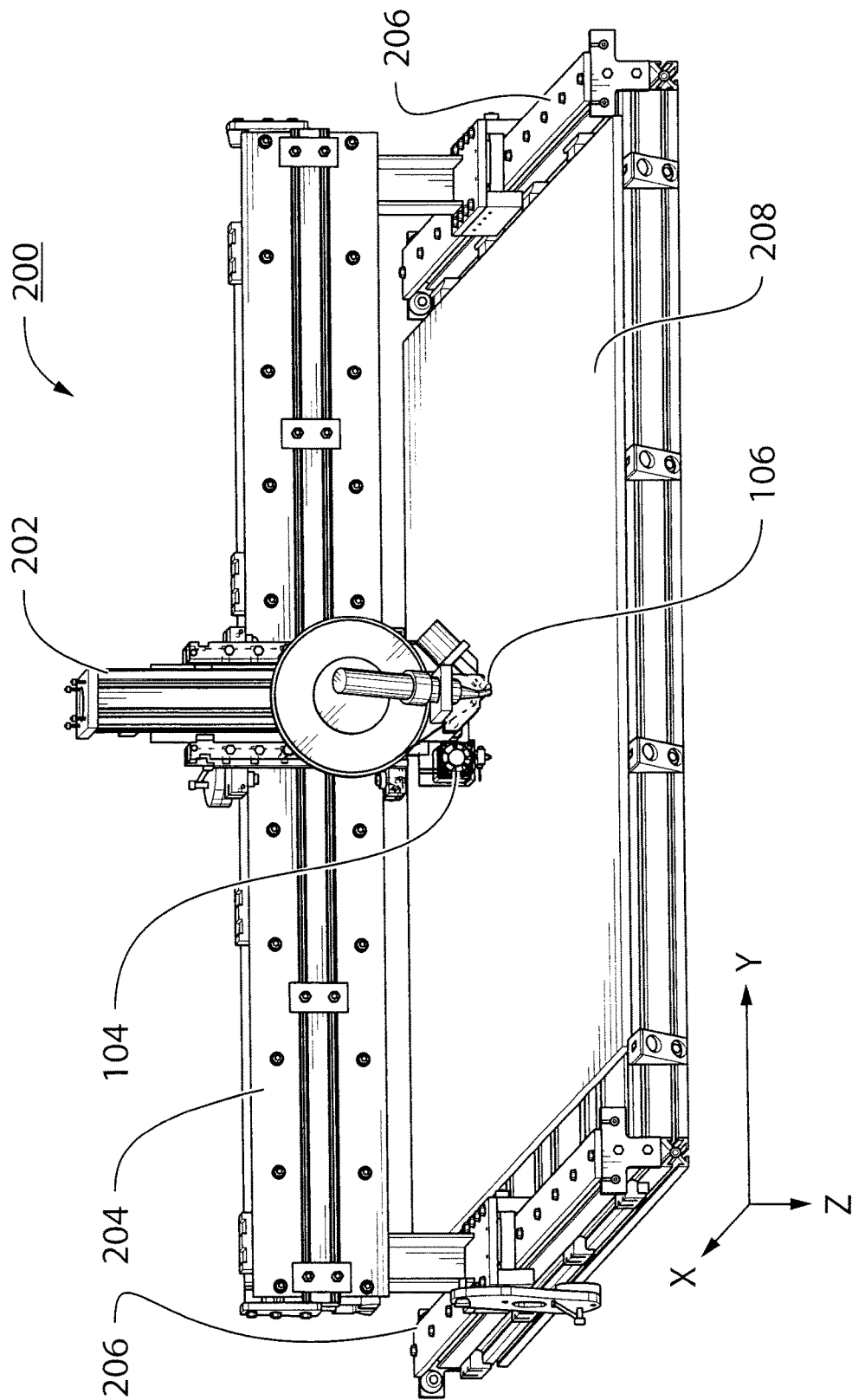
FIG. 2 is a perspective diagram showing an apparatus according to an embodiment of the invention.

FIG. 2 is a simplified perspective view of an apparatus 200 according to an embodiment of the instant invention. A head assembly, including a 3D printing head 104 and a delivery head 106, is mounted to a machine Z-axis rail 202 of a gantry robot. The Z-axis rail 202 is mounted to a Y-axis cross-rail 204, which in turn is mounted to a pair of X-axis rails 206. The apparatus 200 further includes a build bed or base plate 208, which optionally is heated and/or is capable of applying a vacuum suction to provide dimensional stability and to prevent movement of the 3D object during fabrication.

Figure 3:
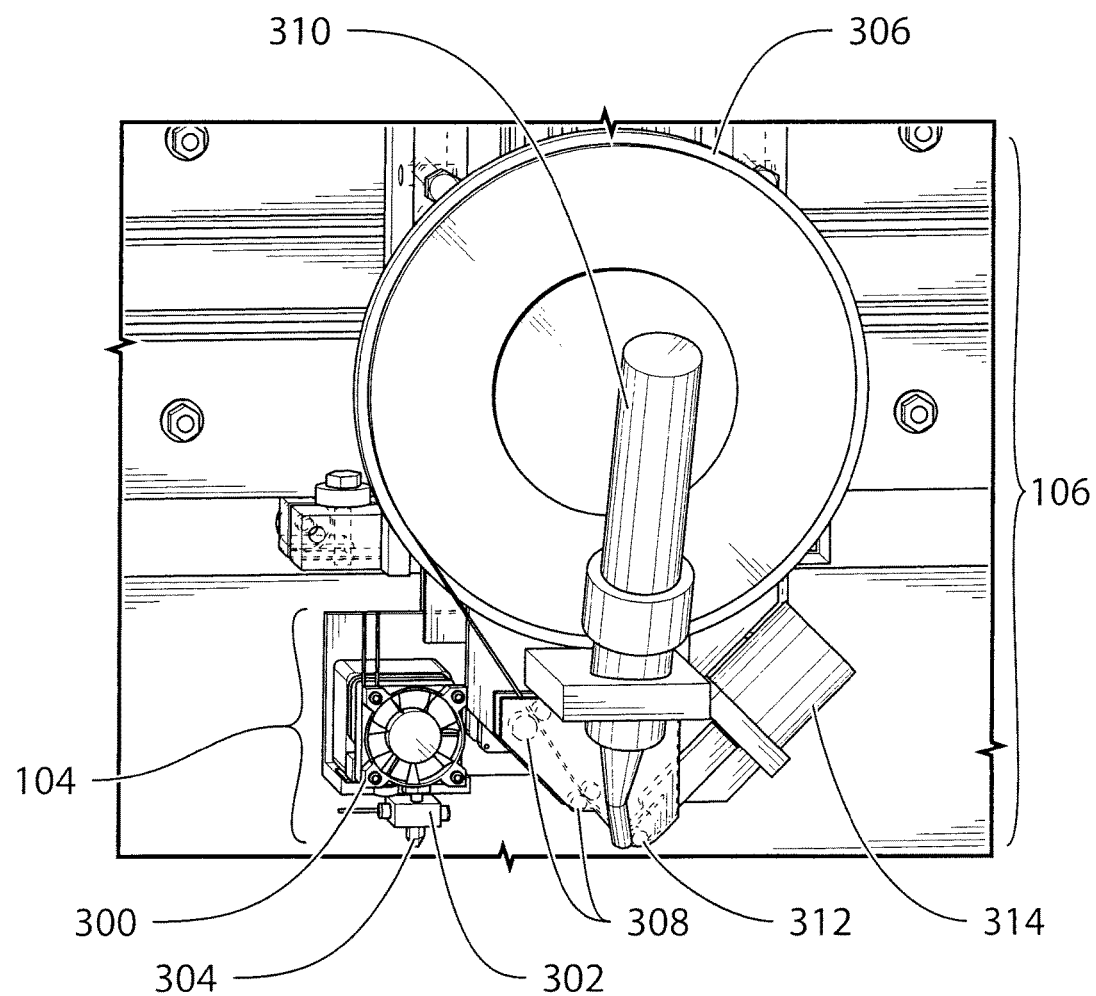
FIG. 3 is a perspective diagram showing enlarged detail of the 3D printing head and delivery head of the apparatus of FIG. 2.

FIG. 3 is a perspective view showing enlarged detail of the head assembly of FIG. 2. In the specific and non-limiting embodiment that is shown in FIG. 3, the 3D printing head 104 is a FDM head including a spool 300 of material filament (typically 1-5 mm diameter), which is heated past its glass transition temperature using heater 302, and which is then extruded via extrusion nozzle 304. The FDM head deposits a very thin layer (typically 0.1-0.5 mm) of the melted material. Optionally, more than one FDM head is provided to support the depositing of different materials or different thicknesses of materials without requiring machine setup changes. For instance, different FDM heads may be used to deposit materials having different colors or different strengths, or to deposit unfilled resins and resins that contain various fillets, etc.

In the specific and non-limiting embodiment that is shown in FIG. 3, the delivery head 106 is an ATL head including a spool 306 of fiber reinforced tape, which is advanced using feed rollers 308 and is heated using heater 310, prior to being pressed in place using support roller 312 and being cut to length using cutter 314. The ATL head lays continuous strips of fibers, with a plastic binder, in three dimensions. By way of a specific and non-limiting example, the tape is between about 1 mm and 50 mm wide and between about 0.1 and 1 mm thick, depending upon the geometry of the 3D object to be produced. Heater 310 is provided, for example, in the form of a laser or a source of hot gas and is directed to heat the tape that is being dispensed at a point where it makes contact with a surface of the 3D object being formed.

Figure 4:
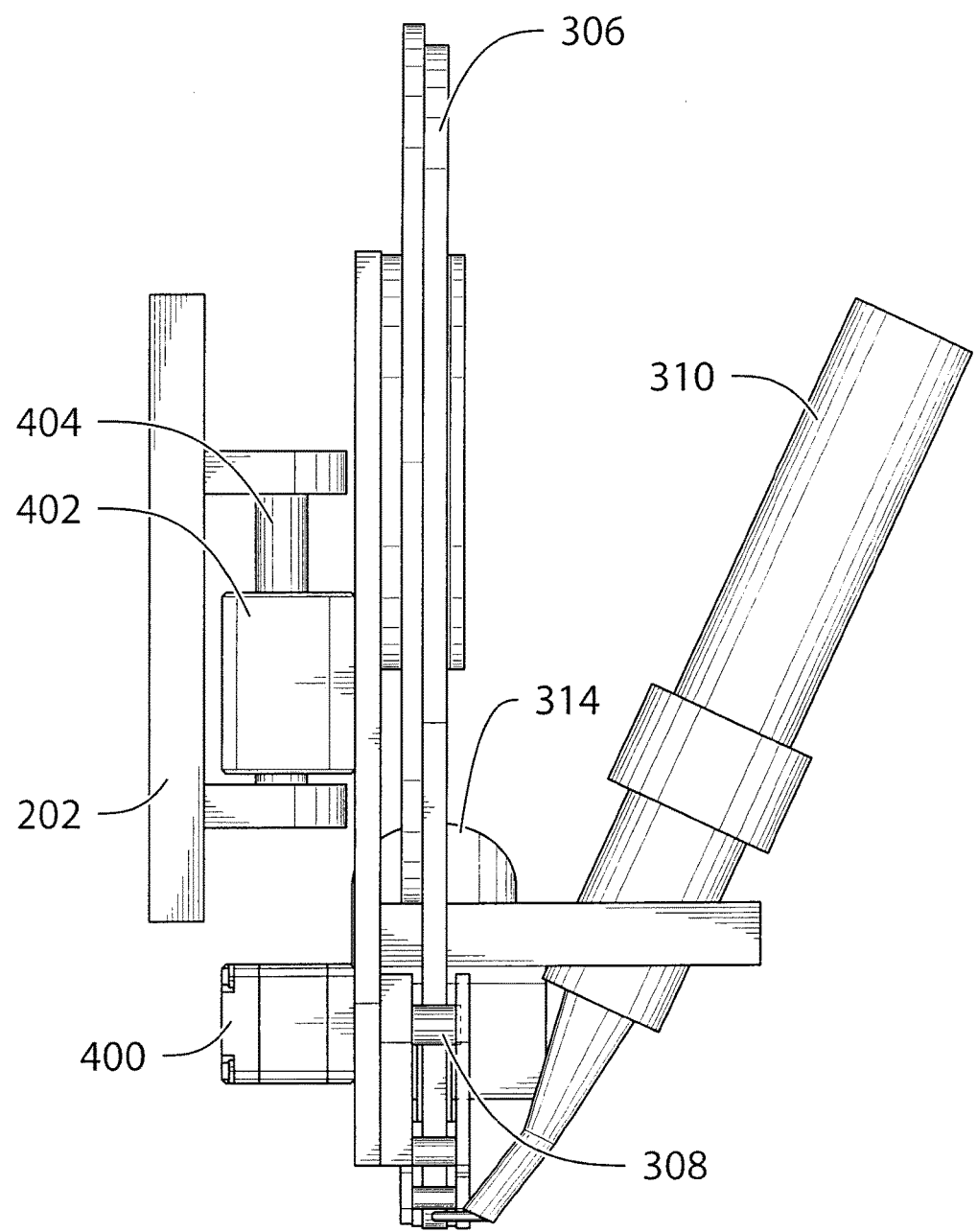
FIG. 4 is a side view showing enlarged detail of the delivery head of the apparatus of FIG. 2.

FIG. 4 is a side view showing additional features of the ATL head, including a drive motor 400 for driving the feed rollers 308 to advance the fiber reinforced tape from the spool 306, to match the motion of the ATL head and to achieve a desired fiber pattern. FIG. 4 also illustrates an indexing system comprising a linear actuator 402 mounted on a cylinder 404, which supports movement of the ATL head relative to the Z-axis rail 202. The ATL head is movable between an extended position (illustrated) and a retracted position. The ATL head is moved into its extended position when it is being used to dispense the fiber reinforced tape. When it is time to instead use the 3D printing head, then the ATL head is moved back into its retracted position and out of the way of the 3D printing head. Accordingly, the linear actuator is operated during switching between operation of the 3D printing head and operation of the ATL head. Additionally, the index system may be spring loaded to provide a constant force on the support roller 312, which presses the tape into place as it is being dispensed.

In the specific and non-limiting example that is shown in FIGS. 1-4, the 3D printing head 104 is fixedly mounted to the Z-axis rail 202 of a gantry robot, and the delivery head 106 is movably mounted to the same Z-axis rail 202 of the gantry robot, via an indexing system. In an alternative configuration, the 3D printing head 104 is mounted to the Z-axis rail of a first gantry robot and the delivery head 106 is mounted to the Z-axis rail of a second gantry robot. In this latter configuration, the indexing system may be omitted such that the delivery head is fixedly mounted to the Z-axis rail of the second gantry robot. Optionally, the delivery head is mounted to the Z-axis rail of the second gantry robot via a biasing member, such as for instance a spring mechanism, which biases the delivery head in an extended position to provide a constant force on the support roller 312, which presses the tape into place as it is being dispensed.

Figure 5:
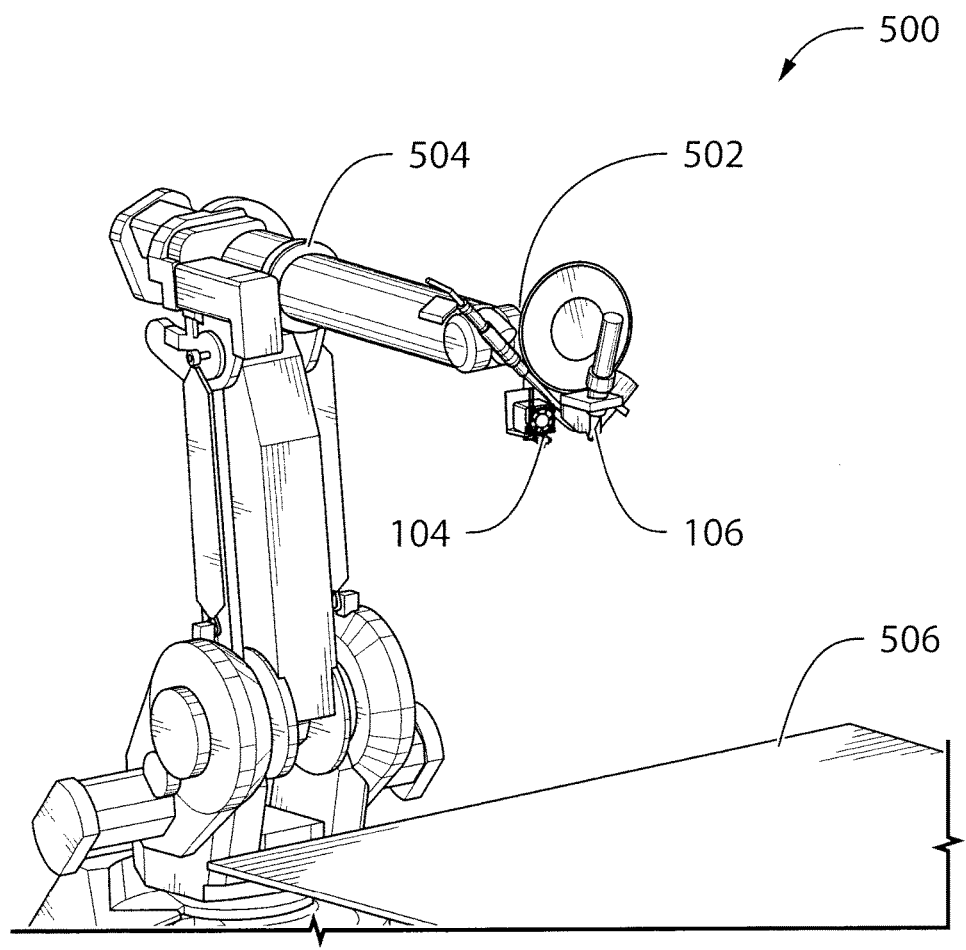
FIG. 5 is a perspective diagram showing another apparatus according to an embodiment of the invention.

FIG. 5 is a perspective diagram showing another system 500 according to an embodiment of the invention. A head assembly, including a 3D printing head 104 and a delivery head 106, is mounted as an end effector 502 of an articulated arm robot 504. The apparatus 500 further includes a build bed or base plate 506, which optionally is heated and/or is capable of applying a vacuum suction to provide dimensional stability and to prevent movement of the 3D object during fabrication. The head assembly is described above with reference to FIGS. 3 and 4. Optionally, the 3D printing head 104 is mounted as an end effector of a first articulated arm robot and the delivery head 106 is mounted as an end effector of a second articulated arm robot. Further optionally, a configuration may include one or more gantry robots and one or more articulated arm robots.

Referring now to FIGS. 6A-6E and FIGS. 7A-7E, shown is a 3D object at different stages of fabrication during a process according to an embodiment of the invention. In particular, FIGS. 6A-6E show a top view of the 3D object at each different stage of fabrication, and FIGS. 7A-7E show the respective enlarged detail of the 3D object's layer structure, within the dash-dot box, at each different stage of fabrication.

As is shown in FIGS. 6A and 7A, the first step of the process is to define the edges and surface contours of the desired 3D object, which in this example is a 3D panel component, using a first material 600. For instance, the 3D printing head 104 is used to deposit successive layers of the first material 600 onto the build bed 208 of apparatus 200. By way of a specific and non-limiting example, the first material is an unreinforced thermoplastic material. The successive layers of the first material 600 fuse together to form a substantially homogeneous first portion of the 3D object. FIG. 7A shows the first material 600 deposited onto the build bed 208. The thickness of the first material 600 is about 0.5 to 5 mm. In general, the first material 600 is sufficiently thick to support the plural plies of continuous fiber tape or tows that are applied in subsequent steps. Not shown in FIG. 6A are optional guides, bosses, attachment points etc. that may be formed using the first material 600. For instance, the dataset that is used to control the 3D printing head may include instructions for forming guides etc. to be used to align the final part with other parts during subsequent assembly processes.

Referring now to FIG. 6B, a next step of the process is to apply a first ply 602 of a continuous fiber tape onto the surface of the first material 600. In the specific example that is shown in FIG. 6B, the delivery head 106 is used to dispense the first ply 602 of the tape with minimal overhang around the edges of the object. As discussed in the preceding paragraphs, the tape is heated as it is dispensed and is pressed into place using support roller 312, causing the tape to adhere to and bond with the surface of the first material 600. The tape is then cut to length close to the edge of the first material 600. In FIG. 6B each length of the tape in the first ply 602 is applied parallel the previous length of tape. Optionally, the tape may be applied using a different application pattern. FIG. 7B shows the first ply 602 of the tape adhered to the first material 600. In FIG. 7B the hatching pattern denotes that all of the continuous fibers in the first ply 602 are aligned in the same direction.

Referring now to FIG. 6C, a next step of the process is to apply a second ply 604 of the continuous fiber tape onto the previously applied first ply 602 of continuous fiber tape. In the specific example that is shown in FIG. 6C, the delivery head 106 is used to also dispense the second ply 604 of the tape with minimal overhang around the edges of the object. The tape is heated as it is dispensed and is pressed into place using support roller 312, causing the tape 602 to adhere to and bond with the surface of the previously applied first ply 602 of continuous fiber tape. The tape is then cut to length close to the edge of the first material 600. In FIG. 6C each length of the tape in the second ply 604 is applied parallel the previous length of tape, and at an angle of approximately 90° relative to the lengths of tape in the first ply 602. Optionally, the tape may be applied using a different application pattern. The continuous fibers in the first ply 602 and the continuous fibers in the second ply 604 are oriented in different directions, thereby increasing the mechanical strength of the 3D object. FIG. 7C shows the second ply 604 of the tape adhered to the first ply 602 of the tape, which in turn is adhered to the first material 600. In FIG. 7C the hatching pattern denoting second ply 604 is opposite the hatching pattern denoting first ply 602, indicating that the continuous fibers in each ply are oriented in the same direction, and that the continuous fibers in the second ply 604 are oriented in a different direction than the continuous fibers in the first ply 602.

Figure 6D:
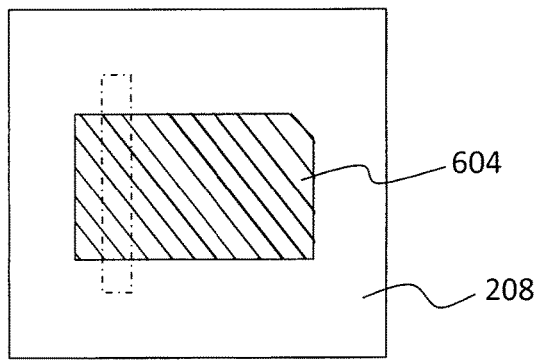
Figure 7D:
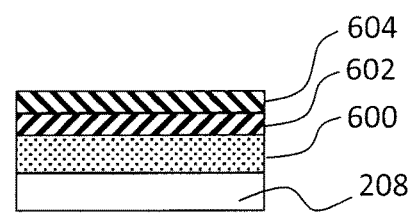

FIG. 6D shows the 3D object after post fabrication processing, such as for instance edge trimming to remove the overhanging continuous fiber tape of the first ply 602 and second ply 604. The structure shown in FIG. 7D is identical to the structure shown in FIG. 7C.

Figure 6E:
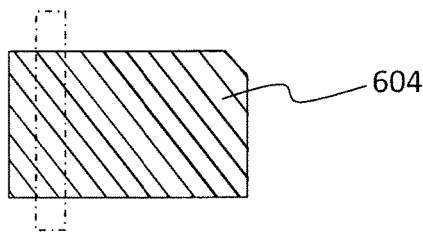
Figure 7E:
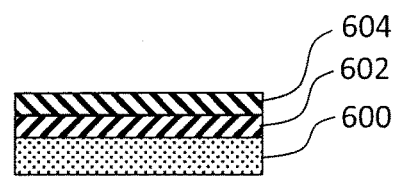

FIG. 6E and FIG. 7E show the finished 3D object after removal from the build bed 208. In this simplified example, only two plies of continuous fiber tape are used. Optionally, more than two plies of continuous fiber tape are used, either with application of the plies in alternating patterns as described above or with application of the plies according to other patterns. Further optionally, tape of different widths and/or different thicknesses are used to form the 3D object. Optionally, different delivery heads are used to apply the tapes of different widths and/or different thicknesses. Optionally, tapes of different widths and/or different thicknesses are used within a same ply. The thicknesses of the different layers shown in FIGS. 7A-7E are not to scale. Optionally, the thickness of a layer is non-uniform. For instance, the thickness of the first material 600 may vary so as to form sections of higher strength to support the plies of continuous fiber tape and/or to define guide and/or attachment features, etc. Further optionally, the 3D printing head is used to form additional features onto surfaces of the continuous fiber tape. In addition, plural 3D printing heads and/or plural delivery heads may be used to apply different materials in order to incorporate materials with different strengths, colors etc. into the final 3D product.

Figure 8:
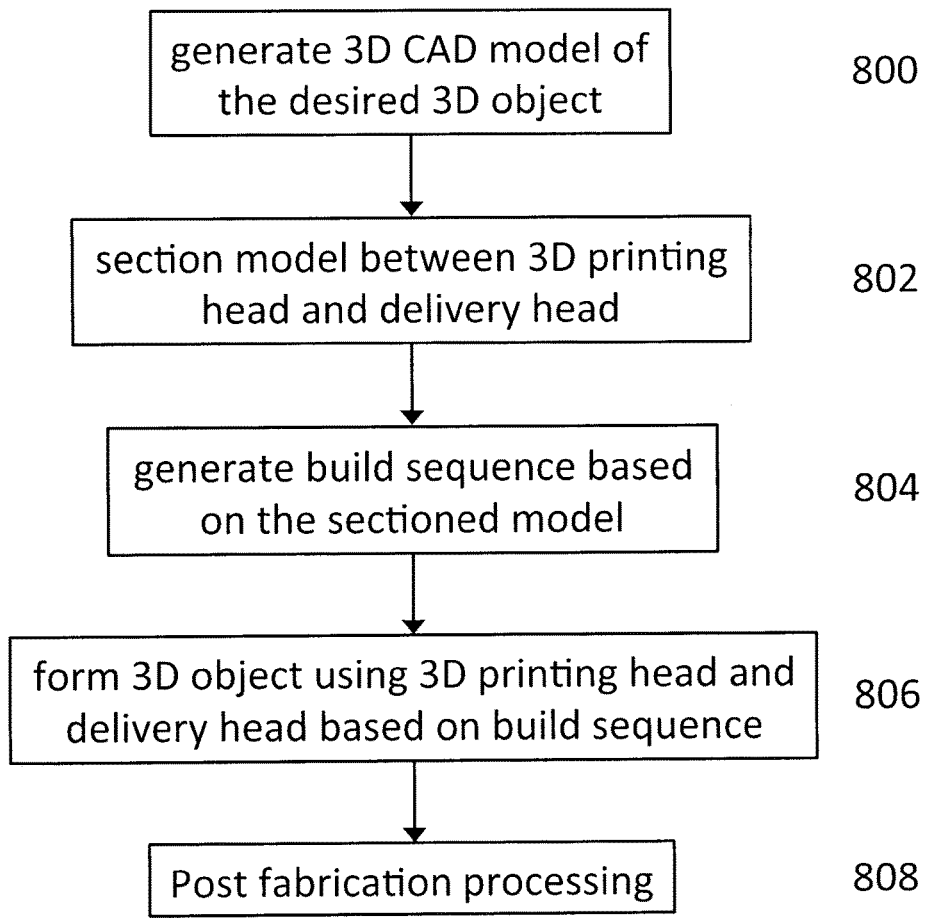
FIG. 8 is a simplified flow diagram for a process according to an embodiment of the invention.

Referring now to FIG. 8, shown is a simplified flow diagram for a process according to an embodiment of the invention. The process of fabricating a 3D object begins at 800 by generating a 3D computer assisted design (CAD) model of the desired part. At 802 the resulting model is sectioned into first portions that are to be built using the 3D printing head 104 and second portions that are to be built using the delivery head 106. More particularly, the first portions are formed using a first material such as for instance an unreinforced thermoplastic resin and the second portions are formed using a continuous fiber tape or tow. A build sequence is generated at 804, based on the sectioned model. Finally, the 3D printing head and the delivery head are used to fabricate the 3D object at 806, according to the build sequence. The 3D printing head 104 and the delivery head 106 are operated to form portions of the 3D object corresponding to the sectioned first and second portions of the 3D CAD model. Depending on the desired shape and mechanical properties of the 3D object, it may be necessary to switch plural times between operating the 3D printing head 104 and operating the delivery head 106. At 808, post fabricating processing is performed. For instance, trimming etc. is performed to remove parts of the continuous fiber tape or tow that overhang the edges of the 3D object.

Figure 9:
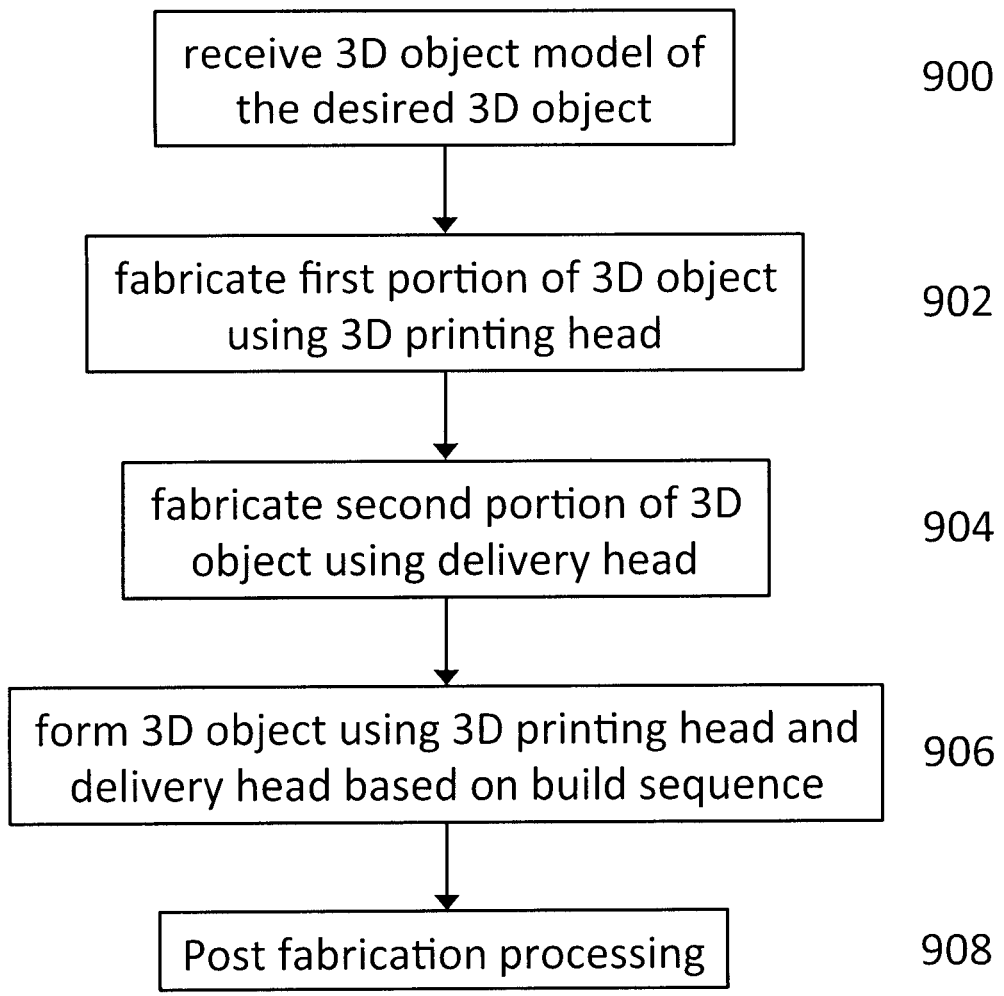
FIG. 9 is a simplified flow diagram for another process according to an embodiment of the invention.

Referring now to FIG. 9, shown is another simplified flow diagram for a process according to an embodiment of the invention. At 900 a controller in communication with the apparatus 200 or the apparatus 500 receives a dataset corresponding to a 3D object model. The dataset includes machine-readable instructions for controlling the 3D printing head 104 and the delivery head 106 to form the 3D object. At 902 the printing head 104 is used to fabricate a first portion of the 3D object, based on the dataset, by forming a plurality of successive layers of a first material. The controller then switches operation to the delivery head 106 at 804, and a second portion of the 3D object is fabricated, based on the dataset, by dispensing onto the first portion of the 3D object a plurality of layers of a continuous-fiber reinforced second material, in the form of a tape or tow. The continuous-fiber reinforced second material is also pressed into place during the dispensing thereof. Additional portions of the 3D object are formed at 906, using the 3D printing head and/or the delivery head, as based on the dataset. At 908, post fabricating processing is performed. For instance, trimming etc. is performed to remove parts of the continuous fiber tape or tow that overhang the edges of the 3D object.

The methods described with reference to FIGS. 8 and 9 are susceptible to modification depending on the intended use, the geometry and the size of the desired 3D object. For instance, an object that is intended for use in a structural or semi-structural application may require more plies of the continuous fiber tape or tow compared to another object that is intended for use in a non-structural application. 3D objects that will form an exposed surface in a final assembly may require additional layers of 3D printed resin material in order to provide an acceptable surface finish. For instance, a surface finish of unreinforced thermoplastic resin may be 3D printed onto sections of the object with exposed tape. Optionally, applying the surface finish is a separate step or is performed as part of step 806 or 902. Additional steps may also be added in order to form attachment or alignment structures, etc. For instance, subsequent to applying continuous fiber tape onto a 3D printed skeleton of the 3D object, additional 3D printing may be performed to add attachment or alignment structures onto the surface of the continuous fiber tape.

In another embodiment, the 3D printing head 104 and the delivery head 106 are used to form a 3D object that incorporates another element, such as for instance a formed sheet-metal blank or a formed plastic structure. A specific and non-limiting example to illustrate this other embodiment will now be described with reference to FIGS. 10A-10G and FIGS. 11A-11G, which show a 3D object at different stages of fabrication during a process according to this other embodiment of the invention. FIGS. 10A-10G show a top view of the 3D object at each different stage of fabrication, and FIGS. 11A-11G show enlarged detail of the 3D object's layer structure, within the dash-dot box, at each different stage of fabrication.

Figure 10A:
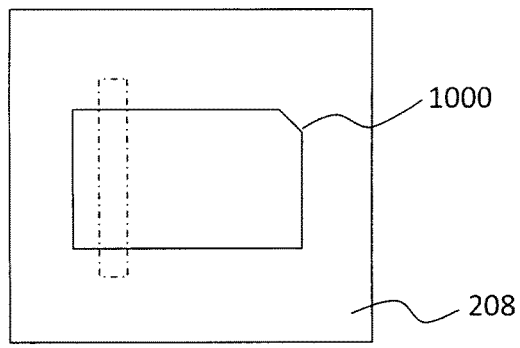
FIGS. 10A-10G are diagrammatic views showing various steps during the fabrication of a 3D object using another process according to an embodiment of the invention.
Figure 11A:
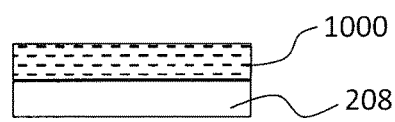
FIGS. 11A-11G illustrate the layered structure within the indicated portion of the 3D object at corresponding steps of the fabrication process shown in FIGS. 10A-10F.

Shown in FIG. 10A is a formed, sheet metal blank 1000 disposed on build bed 208 of apparatus 200. In this example, the sheet metal blank 1000 is provided in the form of a 3D panel component. FIG. 11A shows a side view of the portion of the sheet metal blank 1000 that lies within the dash-dot box, prior to the addition of any other materials or features.

Figure 10B:
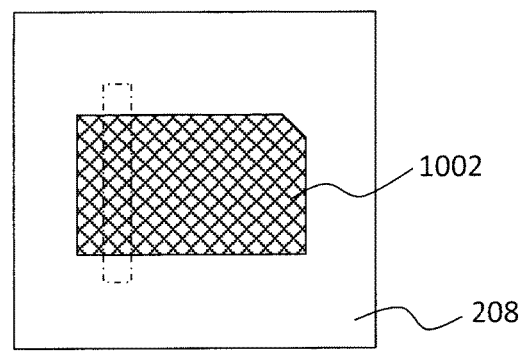
Figure 11B:
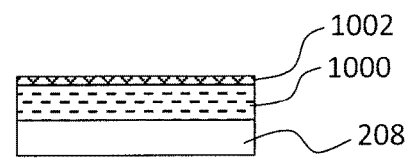

As is shown in FIG. 10B, a primer material 1002 is applied onto the surface of the sheet metal blank 1000. Optionally, the primer material 1002 is applied using a print head attached to the gantry robot, or using another process prior to securing the blank 1000 onto the build bed 208. As is shown in FIG. 11B, the primer material 1002 adheres to the sheet metal blank 1000 and is compatible with other materials that are to be deposited onto the sheet metal blank 1000 in subsequent steps.

Figure 10C:
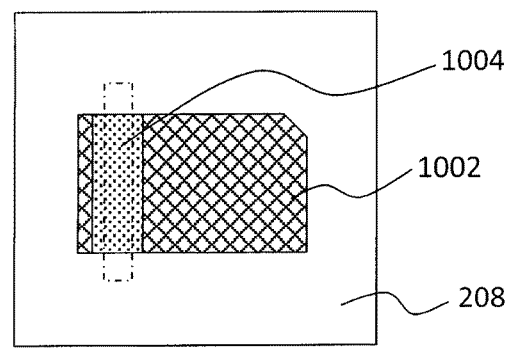
Figure 11C:
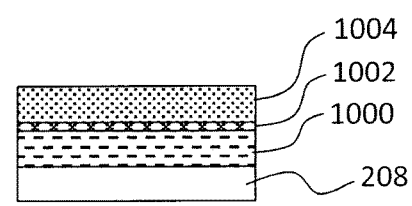

Referring now to FIG. 10C, the 3D printing head 104 is used to deposit successive layers of a first material 1004 onto the primed surface 1002 of sheet metal blank 1000. By way of a specific and non-limiting example, the first material 1004 is an unreinforced thermoplastic material. The successive layers of the first material 1004 fuse together to form a substantially homogeneous first portion of the 3D object. FIG. 11C shows the first material 1004 deposited onto the primed surface 1002 of sheet metal blank 1000. The thickness of the first material 1004 is about 0.5-3 mm. Optionally, the first material is deposited in such a way so as to form guides, bosses, attachment points etc. For instance, the dataset that is used to control the 3D printing head 104 may include instructions for forming guides etc. to be used to align the final part with other parts during subsequent assembly processes.

Figure 10D:
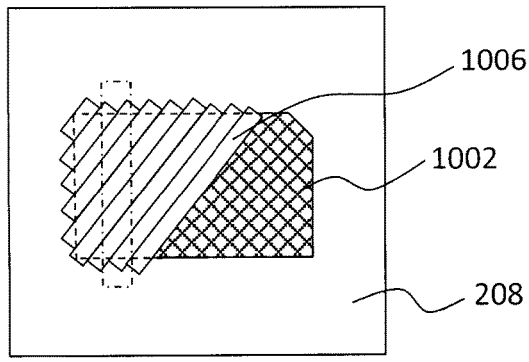
Figure 11D:
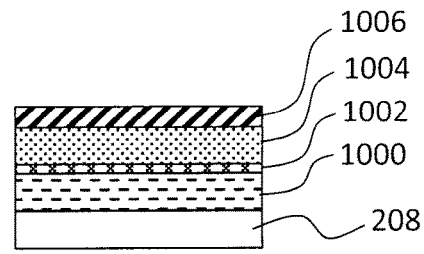

Referring now to FIG. 10D, a next step of the process is to apply a first ply 1006 of a continuous fiber tape onto the surface of the first material 1004 and the primed surface 1002. In the specific example that is shown in FIG. 10D, the delivery head 106 is used to dispense the first ply 1006 of the tape with minimal overhang around the edges of the object. As discussed in the preceding paragraphs, the tape is heated as it is dispensed and is pressed into place using support roller 312, causing the tape to adhere to and bond with the surface of the first material 1004 and the primed surface 1002. The tape is then cut to length. In FIG. 10D each length of the tape in the first ply 1006 is applied parallel the previous length of tape. Optionally, the tape may be applied using a different application pattern. FIG. 11D shows the first ply 1006 of the tape adhered to the first material 1004, which in turn is adhered to the primer 1002. Outside of the dash-dot box, the first ply 1006 of the tape is adhered directly to the primed surface 1002. In FIG. 11D the hatching pattern denotes that all of the continuous fibers in the first ply 1006 are aligned in the same direction.

Figure 10E:
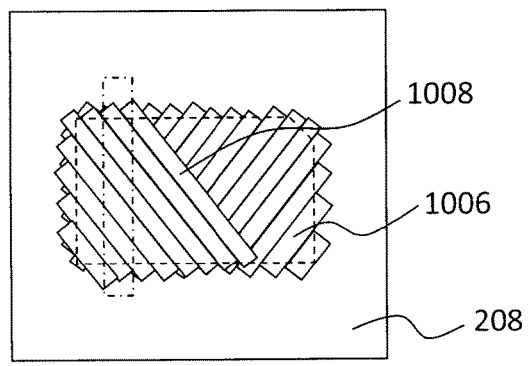
Figure 11E:
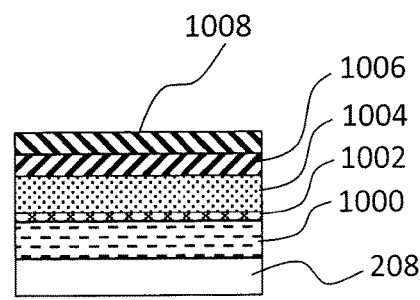

Referring now to FIG. 10E, a next step of the process is to apply a second ply 1008 of the continuous fiber tape onto the previously applied first ply 1006 of continuous fiber tape. In the specific example that is shown in FIG. 10E, the delivery head 106 is used to also dispense the second ply 1008 of the tape with minimal overhang around the edges of the object. The tape is heated as it is dispensed and is pressed into place using support roller 312, causing the tape to adhere to and bond with the surface of the previously applied first ply 1006 of continuous fiber tape. The tape is then cut to length. In FIG. 10E each length of the tape in the second ply 1008 is applied parallel the previous length of tape, and at an angle of approximately 90° relative to the lengths of tape in the first ply 1006. Optionally, the tape may be applied using a different application pattern. The continuous fibers in the first ply 1006 and the continuous fibers in the second ply 1008 are oriented in different directions, thereby increasing the mechanical strength of the 3D object. FIG. 11E shows the second ply 1008 of the tape adhered to the first ply 1006 of the tape, which in turn is adhered to the first material 1004, which in turn is adhered to the primer 1002. In FIG. 11E the hatching pattern denoting second ply 1008 is opposite the hatching pattern denoting first ply 1006, indicating that the continuous fibers in each ply are oriented in the same direction, and that the continuous fibers in the second ply 1008 are oriented in a different direction than the continuous fibers in the first ply 1006.

Figure 10F:
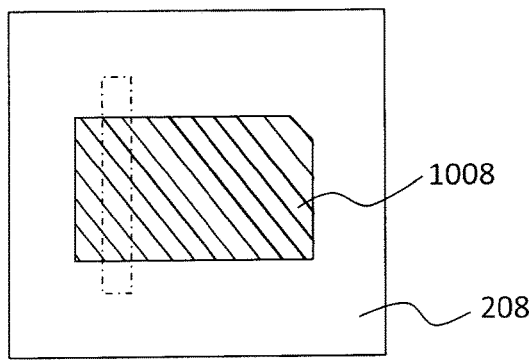
Figure 11F:
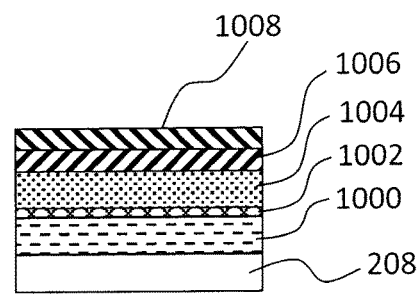

FIG. 10F shows the 3D object after post fabrication processing, such as for instance edge trimming to remove the overhanging continuous fiber tape of the first ply 1006 and second ply 1008. The structure shown in FIG. 11F is identical to the structure shown in FIG. 11E.

Figure 10G:
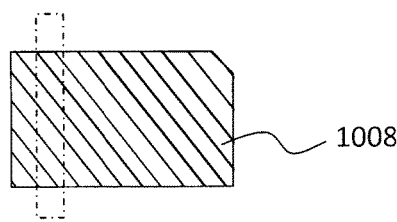
Figure 11G:
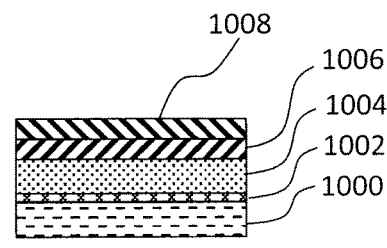

FIG. 10G and FIG. 11G show the finished 3D object after removal from the build bed 208. In this simplified example, only two plies of continuous fiber tape are used. Optionally, more than two plies of continuous fiber tape are used, either with application of the plies in alternating patterns as described above or with application of the plies according to other patterns. Further optionally, tape of different widths and/or different thicknesses are used to form the 3D object. Optionally, different delivery heads are used to apply the tapes of different widths and/or different thicknesses. Optionally, tapes of different widths and/or different thicknesses are used within a same ply. The thicknesses of the different layers shown in FIGS. 11A-11G are not to scale. Optionally, the thickness of a layer is non-uniform. For instance, the thickness of the first material 1004 may vary so as to form sections of higher strength to support the plies of continuous fiber tape and/or to define guide and/or attachment features, etc. Further optionally, the 3D printing head is used to form additional features onto surfaces of the continuous fiber tape. In addition, plural 3D printing heads and/or plural delivery heads may be used to apply different materials in order to incorporate materials with different strengths, colors etc. into the final 3D product. Still further optionally, the primer material 1002 is not applied to the entire surface of the sheet-metal blank 1000. For instance, the primer material is jetted onto, or painted or rolled onto, only predetermined portions of the sheet metal blank onto which the first material 1004 or the continuous fiber tape is to be applied.

Figure 12:
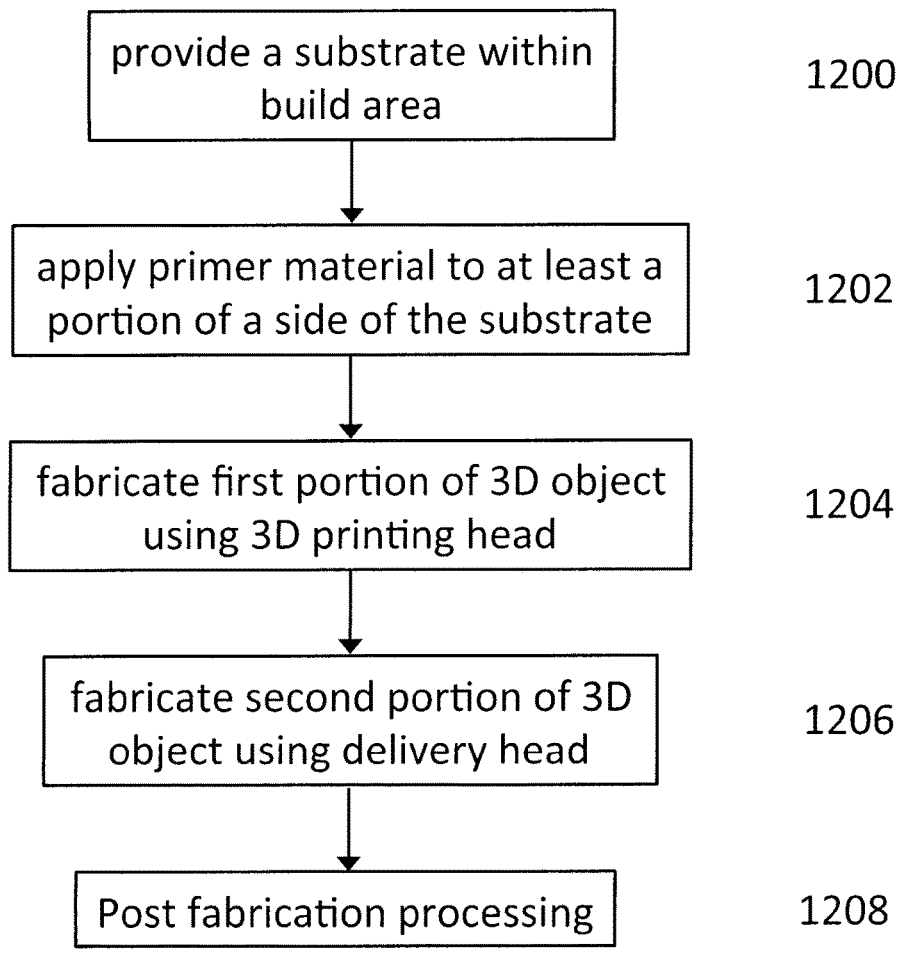
FIG. 12 is a simplified flow diagram for another process according to an embodiment of the invention.

Referring to FIG. 12, shown is a simplified flow diagram for another process according to an embodiment of the invention. At 1200 a substrate, for instance a formed sheet-metal blank or a substrate formed from another material, is provided within a build area. A primer is applied to at least a portion of one surface of the substrate at 1202. At 1204, a controller in communication with the apparatus 200 or the apparatus 500 receives a dataset corresponding to a 3D object model that is to be formed on the primed surface of the substrate. The dataset includes machine-readable instructions for controlling the 3D printing head 104 and the delivery head 106 to form the 3D object. At 1206 the printing head 104 is used to fabricate a first portion of the 3D object, based on the dataset, by forming a plurality of successive layers of a first material on the primed surface of the substrate. The controller then switches operation to the delivery head 106 at 1208, and a second portion of the 3D object is fabricated, based on the dataset, by dispensing onto the first portion of the 3D object a plurality of layers of a continuous-fiber reinforced second material, in the form of a tape or tow. The continuous-fiber reinforced second material is also pressed into place during the dispensing thereof. Optionally, step 1204 and/or step 1206 is repeated to form additional portions of the 3D object using the 3D printing head and/or the delivery head, based on the dataset. At 1208, post fabricating processing is performed. For instance, trimming etc. is performed to remove parts of the continuous fiber tape or tow that overhang the edges of the 3D object.

The method described with reference to FIG. 12 is susceptible to modification depending on the intended use, the geometry and the size of the desired 3D object. For instance, an object that is intended for use in a structural or semi-structural application may require more plies of the continuous fiber tape or tow compared to another object that is intended for use in a non-structural application. 3D objects that will form an exposed surface in a final assembly may require additional layers of 3D printed resin material in order to provide an acceptable surface finish. For instance, a surface finish of unreinforced thermoplastic resin may be 3D printed onto sections of the object with exposed tape. Optionally, applying the surface finish is a separate step or is performed as part of step 1204. Additional steps may also be added in order to form attachment or alignment structures, etc. For instance, subsequent to applying continuous fiber tape onto a 3D printed skeleton of the 3D object, additional 3D printing may be performed to add attachment or alignment structures onto the surface of the continuous fiber tape.

Figure 13:
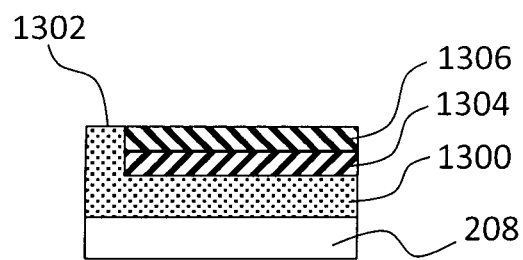
FIG. 13 illustrates the layered structure within a 3D object that is fabricated in accordance with an embodiment of the invention, proximate an edge portion of the 3D object.
Figure 14:
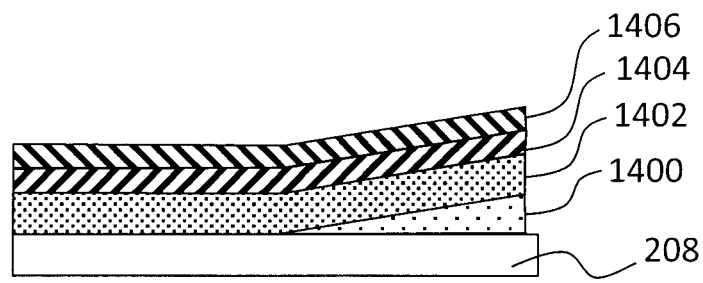
FIG. 14 illustrates the layered structure within a 3D object that is fabricated in accordance with an embodiment of the invention, proximate a transition between a horizontal portion and an inclined portion of the 3D object.

Referring now to FIGS. 13 and 14, shown are the layered structures within other 3D objects that are fabricated in accordance with an embodiment of the invention, proximate an edge portion and proximate a transition between a horizontal portion and an inclined portion, respectively. As is shown more clearly in FIGS. 13 and 14, the 3D printing head may be used to form portions of the object that are not planar, either by printing layer-upon-layer within a localized region (FIG. 13) or by printing one portion of the 3D object at an angle that is inclined relative to another portion of the 3D object (FIG. 14).

Now with particular reference to FIG. 13, the 3D print head may be used to form a resin layer 1300 having a feature 1302, such as for instance an edge along the perimeter of the 3D object. In this example, the feature 1302 protects the tape layers 1304 and 1306 from being damaged, which could expose the fibers within the tape layers and cause further fraying of the tape or injury to anyone who brushes against the exposed fibers.

Now with particular reference to FIG. 14, the print head and the delivery head may be used to form a first region of a 3D object that is substantially horizontal relative to build bed 208, as well as a second region that is inclined relative to both the first region and the build bed 208. Optionally, a support 1400 is either provided or deposited using the print head. The support 1400 may be used during the fabrication of multiple 3D objects, or a new support 1400 may be formed every time a 3D object is fabricated and removed from the build bed 208 along with the 3D object. The support 1400 provides a support surface on which the inclined second region is to be formed. A layer 1402 of unfilled resin is formed on the build bed 208 and support 1400. For instance, the print head is carried by a robotic arm or gantry robot with five or more axes of movement. Using such a robotic system, the print head may move in the X-direction and in the Y-direction to form a layer as discussed with reference to FIGS. 2-4, and then stepped in Z-direction prior to forming a next layer. In addition, using such a robotic system the print head may also be moved in the X-Z and Y-Z plane, thereby supporting the formation of layers or features that are not contained within the X-Y plane. Similarly, the delivery head may also be moved in the X-Z and Y-Z plane during dispensing of the tape or tow to form the layers 1404 and 1406, etc.

An apparatus according to an embodiment of the instant invention is suitable for rapid prototyping (RP) applications as well as low volume and/or custom fabrication needs. In particular, the apparatus is suitable for producing "panel" type components typical to automotive applications. The combination of 3D printed portions and fiber-reinforced portions results in the fabrication of components that have significantly better structural performance compared to existing RP processes. Further, complex components may be fabricated without using specialized tooling or mandrels.

The embodiments that are described herein are simplified in order to better convey a clear understanding of the present invention. Optionally, more than a single 3D printing head 104 and/or more than a single delivery head 106 may be provided. For instance, plural 3D printing heads and/or plural delivery heads may be provided in order to increase speed of fabrication, to support inclusion of different materials (e.g., different colors, different fiber/mineral filled resins, different tape thicknesses or widths, etc.).

While the above description constitutes a plurality of embodiments of the present invention, it will be appreciated that the present invention is susceptible to further modification and change without departing from the fair meaning of the accompanying claims.

What is claimed is:

1. An apparatus for forming a three-dimensional (3D) object, comprising:
 a 3D printing head for fabricating a first portion of the 3D object by forming a plurality of successive layers of a first material;
 a delivery head for fabricating a second portion of the 3D object by dispensing onto the first portion of the 3D object a plurality of layers of a continuous-fiber reinforced second material, and the delivery head comprising:
   a spool for supporting a supply of the continuous-fiber reinforced second material;
   a pressing roller for pressing the continuous-fiber reinforced second material into place on the first portion of the 3D object during dispensing of said continuous-fiber reinforced second material;
   feed rollers for advancing the continuous-fiber reinforced second material from the spool directly to the pressing roller; and
   a heater directed to heat the continuous-fiber reinforced second material at a point where said second material makes contact with a surface of the 3D object being formed; and
 a controller for receiving a dataset corresponding to a 3D object model and for directing the 3D printing head and the delivery head to cooperatively form the 3D object based on the dataset.

2. The apparatus according to claim 1, wherein the heater is one of a laser and a source of hot gas, for heating the continuous-fiber reinforced second material immediately prior to said continuous-fiber reinforced second material being pressed into place.

3. The apparatus according to claim 1, wherein the 3D printing head is a fused deposition modeling (FDM) head and wherein the first material is a thermoplastic resin.

4. The apparatus according to claim 1, wherein the delivery head is one of an automated tape layup (ATL) head and an automated fiber placement (AFP) head.

5. The apparatus according to claim 1, wherein the 3D printing head is fixedly mounted to a gantry and wherein the delivery head is mounted to the gantry via a linear actuator, the linear actuator for controllably extending and retracting the delivery head relative to the 3D object for selectively switching between operating the 3D printing head and operating the delivery head.

6. The apparatus according to claim 1, wherein the 3D printing head and the delivery head are mounted to a computer numerically controlled machine that is controlled by the controller and that supports at least five axes of movement.

7. The apparatus of claim 6, wherein the 3D printing head and the delivery head are mounted to a single gantry.

8. The apparatus of claim 6, wherein the 3D printing head is mounted to a first gantry and the delivery head is mounted to a second gantry.

9. The apparatus of claim 6, wherein the 3D printing head and the delivery head are mounted to a single robotic arm.

10. The apparatus of claim 6, wherein the 3D printing head is mounted to a first robotic arm and the delivery head is mounted to a second robotic arm.

11. The apparatus according to claim 1, wherein during use the continuous-fiber reinforced second material does not pass through an extrusion nozzle when it is being advanced from the feed rollers directly to the pressing roller.

12. A process for forming a three-dimensional object, comprising:
   receiving a dataset corresponding to a 3D object model;
   fabricating a first portion of the 3D object based on the dataset by forming a plurality of successive layers of a first material using a 3D printing head; and
   fabricating a second portion of the 3D object based on the dataset by dispensing onto the first portion of the 3D object a plurality of layers of a continuous-fiber reinforced second material using a delivery head, directing a heater to heat the continuous-fiber reinforced second material at a point where said second material makes contact with a surface of the 3D object being formed, and pressing the continuous-fiber reinforced second material into place during the dispensing thereof using a pressing roller, wherein the continuous-fiber reinforced second material is advanced from feed rollers directly to the pressing roller.

13. The process according to claim 12, comprising switching between the 3D printing head and the delivery head a plurality of times while forming the 3D object.

14. The process according to claim 12, wherein the 3D printing head is a fused deposition model (FDM) head and wherein the first material is a thermoplastic unreinforced resin.

15. The process according to claim 12, wherein the delivery head is one of an automated tape layup (ATL) head and an automated fiber placement (AFP) head, and wherein the continuous-fiber reinforced second material comprises unidirectional fibers pre-impregnated with a matrix material.

16. The process according to claim 15, wherein the unidirectional fibers are selected from the group consisting of glass, carbon, aramid and mineral fibers, and wherein the matrix material is compatible with the first material.

17. The process according to claim 15, wherein the unidirectional fibers in adjacent layers of the plurality of layers of the continuous-fiber reinforced second material are arranged at one of 45°, 90° and 135°, plus or minus 15°, to one another.

18. The process according to claim 12, wherein forming the plurality of successive layers of the first material using the 3D printing head comprises forming a stack of layers, each layer in the stack having a different shape in an X-Y plane.

19. The process according to claim 18, wherein forming the plurality of successive layers of the first material using the 3D printing head further comprises moving the 3D printing head in at least one of the X-direction and the Y-direction, and simultaneously moving the delivery head in a Z-direction that is normal to the X-Y plane.

20. The process according to claim 18, wherein dispensing the continuous-fiber reinforced second material comprises moving the delivery head in at least one of the X-direction and the Y-direction, and simultaneously moving the delivery head in a Z-direction that is normal to the X-Y plane.

21. The process according to claim 12, further comprising the steps of:
   prior to receiving the dataset, providing a sheet-metal blank; and
   coating at least a portion of at least one side of the sheet metal blank with a primer material,
   wherein the plurality of successive layers of the first material are formed on the coated at least a portion of the sheet-metal blank.

22. The process according to claim 12, wherein the dataset further corresponds to a removable support member for the 3D object model, and comprising:
   prior to fabricating the 3D object, fabricating the removable support member based on the dataset by forming a plurality of successive layers of a third material using a 3D printing head, wherein the 3D object is fabricated by dispensing the first material onto the removable support member to form the plurality of successive layers of the first material; and
   removing the removable support member from the 3D object.

23. The process according to claim 12, comprising:
   receiving a second dataset corresponding to a removable support member for the 3D object model;
   prior to fabricating the 3D object, fabricating the removable support member based on the second dataset by forming a plurality of successive layers of a third material using a 3D printing head, wherein the 3D object is fabricated by dispensing the first material onto the removable support member to form the plurality of successive layers of the first material; and
   removing the removable support member from the 3D object.

24. The process according to claim 12, wherein directing the heater comprises one of directing a laser beam and a source of hot gas at the point where said second material makes contact with the surface of the 3D object being formed.

25. The process of claim 12, wherein the continuous-fiber reinforced second material does not pass through an extrusion nozzle when it is being advanced from the feed rollers directly to the pressing roller.

* * * * *